US012754372B2

(12) United States Patent
Oka

(10) Patent No.: US 12,754,372 B2
(45) Date of Patent: Oct. 6, 2026

(54) OPTICAL DEVICE, OPTICAL TRANSMITTING APPARATUS, AND OPTICAL RECEIVING APPARATUS

(71) Applicant: FUJITSU OPTICAL COMPONENTS LIMITED, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 364 days.

(21) Appl. No.: 18/626,932

(22) Filed: Apr. 4, 2024

(65) Prior Publication Data

US 2024/0377594 A1 Nov. 14, 2024

(30) Foreign Application Priority Data

May 12, 2023 (JP) ................................ 2023-079087

(51) Int. Cl.
*G02B 6/24* (2006.01)
*G02B 6/122* (2006.01)
(Continued)

(52) U.S. Cl.
CPC ............... *G02B 6/24* (2013.01); *G02B 6/122* (2013.01); *G02B 6/14* (2013.01); *G02B 2006/12097* (2013.01); *G02B 2006/12152* (2013.01)

(58) Field of Classification Search
CPC ........ G02B 6/122; G02B 6/1228; G02B 6/14; G02B 6/24
See application file for complete search history.

(56) References Cited

U.S. PATENT DOCUMENTS

2004/0017976 A1 1/2004 Luo et al.
2005/0202554 A1 9/2005 Luo et al.
(Continued)

FOREIGN PATENT DOCUMENTS

JP 2006-517673 7/2006
JP 2014-41253 3/2014
(Continued)

OTHER PUBLICATIONS

Dai et al., "Mode conversion in tapered submicron silicon ridge optical waveguides", Optics Express, vol. 20, No. 12, Jun. 4, 2012, pp. 13425-13439.

*Primary Examiner* — Michael Stahl
(74) *Attorney, Agent, or Firm* — STAAS & HALSEY LLP

(57) ABSTRACT

An optical device includes a first channel waveguide, a second channel waveguide, a slab generator, and a rib waveguide connected to the slab generator. The second channel waveguide includes a first connection connected to the first channel waveguide and a second connection connected to the slab generator, and the second channel waveguide is wider at the second connection than at the first connection. A slab region of the slab generator includes a third connection connected to the rib waveguide, and the slab region widens from the second connection of the second channel waveguide toward the third connection. The effective refractive indexes of the waveguide modes at the first connection are larger in the order of TE0, TM0, and TE1, meanwhile the effective refractive indexes of the waveguide modes at the second and third connections are larger in the order of TE0, TE1, and TM0.

11 Claims, 13 Drawing Sheets

(51) Int. Cl.
*G02B 6/14* (2006.01)
*G02B 6/12* (2006.01)

(56) References Cited

U.S. PATENT DOCUMENTS

| | | | | |
|---|---|---|---|---|
| 2016/0131836 | A1 | 5/2016 | Matsumoto | |
| 2016/0246005 | A1 | 8/2016 | Liu et al. | |
| 2023/0418091 | A1 * | 12/2023 | Kelly | G02F 1/0142 |
| 2024/0231015 | A9 * | 7/2024 | Toda | G02B 6/125 |

FOREIGN PATENT DOCUMENTS

| | | | | |
|---|---|---|---|---|
| JP | 2016-188956 | | | 11/2016 |
| JP | 2016-188956 | A | * | 11/2016 |
| WO | WO 03/050580 | A2 | | 6/2003 |
| WO | WO 2014/196103 | A1 | | 12/2014 |

* cited by examiner

OPTICAL DEVICE, OPTICAL TRANSMITTING APPARATUS, AND OPTICAL RECEIVING APPARATUS

CROSS-REFERENCE TO RELATED APPLICATION

This application is based upon and claims the benefit of priority of the prior Japanese Patent Application No. 2023-079087, filed on May 12, 2023, the entire contents of which are incorporated herein by reference.

FIELD

The embodiments discussed herein are related to an optical device, an optical transmitting apparatus, and an optical receiving apparatus.

BACKGROUND

In recent years, for example, coherent optical communication technologies have been used to achieve high-speed, high-capacity communications in optical fiber communication networks. An optical device to be used in an optical transceiver for coherent optical communications is preferably small in size. Therefore, the optical device includes, for example: a silicon-on-insulator (SOI) wafer substrate; a $SiO_2$ lower cladding that is a buried oxide (BOX) layer formed on the substrate; and a Si core having a desired shape formed on the lower cladding. The optical device further includes a $SiO_2$ upper cladding stacked on the lower cladding and the core. Such silicon photonics technology is used to form the optical device such as an optical waveguide substrate.

In the optical waveguide substrate, for example, two types of waveguides, that is, a channel waveguide and a rib waveguide are commonly used. The channel waveguide has a large refractive-index difference in the direction of waveguide width, and hence, by steeply bending the waveguide, the size of the optical device can be reduced. On the other hand, the rib waveguide enables a propagation loss caused by roughness of a sidewall of the core to be reduced and is accordingly advantageous for long routing from the viewpoint of loss reduction. Thus, the optical device can be optimally designed by appropriately changing a waveguide structure including the channel waveguide and the rib waveguide. There has been provided a waveguide conversion structure that converts between the rib waveguide and the channel waveguide when connecting the rib waveguide to the channel waveguide (for example, see D. Dai, Y. Tang, and J. E. Bowers, "Mode conversion in tapered submicron silicon ridge optical waveguides," *Opt. Express* 20(12), 13425-13439 (2012)).

FIG. 10 is a schematic diagram illustrating an example of a conventional waveguide conversion structure. A waveguide conversion structure 100 illustrated in FIG. 10 includes a channel waveguide 110, a rib waveguide 130, and a conversion unit 120 connected between the channel waveguide 110 and the rib waveguide 130. The conversion unit 120 includes: a channel core 120C in the conversion unit 120; and a reverse-tapered slab 120D gradually widening from the channel waveguide 110 toward the rib waveguide 130 on both sides of the core 120C. The conversion unit 120 has a continuous structure from the channel waveguide 110 to the rib waveguide 130 along the direction of light travel, which allows very low-loss waveguide conversion.

It has been generally known that, in the channel waveguide 110, it is difficult to guide a higher mode as a waveguide mode. It had also been known that the channel waveguide 110 is often used in the form of a curved waveguide, and, at a curved portion of the channel waveguide 110, the higher mode is mode-converted into a lower mode to be used for signal propagation, and the lower mode after the mode conversion interferes with a lower mode to be used for signal propagation.

There are two types of waveguide modes, that is, a transverse electric (TE) mode mainly including an electric field horizontal to a substrate and a transverse magnetic (TM) mode mainly including an electric field vertical to the substrate. Furthermore, the TE and TM modes include waveguide modes, for example, TEi and TMi (i=0, 1, 2 . . . ), respectively. Here, among the TE and TM modes, the TEi and the TMi are waveguide modes each having the (i+1)th largest effective refractive index Neff. In particular, TE0 and TM0 are called basic modes.

The number of the waveguide modes increases when the size of a waveguide cross section increases. FIG. 11 is a cross-sectional schematic diagram illustrating an example of the channel waveguide 110. The channel waveguide 110 includes a $SiO_2$ lower cladding 140A formed on a not-illustrated substrate, an Si core 110A formed on the lower cladding 140A, and a $SiO_2$ upper cladding 140B stacked on the lower cladding 140A and the core 110A. Note that the wavelength of light guided through the channel waveguide 110 is 1.55 μm, the core width, which is the width of the core 110A of the channel waveguide 110, is w (nm), and the thickness of the core 110A of the channel waveguide 110 is 0.22 μm. FIG. 12 is a diagram illustrating an example of a correspondence relationship between the core width w and the effective refractive index Neff. Note that the effective refractive index is calculated using a finite element method. Referring to FIG. 12, when the core width w is 400 nm, only TE0 and TM0 as waveguide modes are guided in the core 110A in the channel waveguide 110. Also, it is found that, when the core width w exceeds 460 nm, for example, the core width w is 500 nm, besides TE0 and TM0, TE1 is guided.

In general, the waveguide mode TE0, which enables the strongest optical confinement, is employed for signal propagation in optical transceivers. When the core width $w<0.46$ μm, TE1 is not guided, and therefore a single-mode operation can be realized. However, when the core width w is narrower, propagation loss due to roughness of the sidewall of the channel waveguide 110 is higher. Therefore, in general, in the channel waveguide 110, a core width enough to allow TE1 to be guided is employed, but it is preferable for TE1 to be guided with more difficulties. However, when the effective refractive index Neff is smaller, light confinement to the core is weaker, so that, in general, compared with TM0, TE1 preferably occurs in a region in which the effective refractive index is lower. Therefore, the core width w of the channel waveguide 110 is desirably within a range of $0.46\ \mu m<w<0.66\ \mu m$, for example.

In the channel waveguide 110, TE1 is guided, but, when TE1 is mode-converted to TE0, TE0 after the mode-conversion interferes with TE0 to be used in signal propagation and thereby optical power is changed, which is not preferable from the viewpoint of optical communication quality. Therefore, there has been provided a directional coupler having a structure that removes TE1 outputted from the channel waveguide 110 (for example, see Japanese Laid-open Patent Publication No. 2014-041253).

The directional coupler includes two waveguides and uses light leakage (evanescent waves) from the core to cause a light transition from one waveguide to another waveguide adjacent to the one waveguide, and exhibits a greater effect when the light leakage is greater. The greater effect allows a reduction in the size of a device that is needed to be removed.

Thus, compared with the channel waveguide 110, the rib waveguide 130 causes greater light leakage to a slab 130B, and therefore the directional coupler of the rib waveguide 130 can more greatly improve characteristics. Therefore, from the viewpoint of overall size reduction, unnecessary TE1 guided in the channel waveguide 110 is preferably removed by the directional coupler after the conversion from the channel waveguide 110 to the rib waveguide 130.

However, in the case where the magnitude relationship between the effective refractive index of TE1 and the effective refractive index of TM0 is reversed when the channel waveguide 110 is converted to the rib waveguide 130, mode conversion from TE1 to TM0 occurs because the rib waveguide 130 has an asymmetric structure of refractive index distribution in the waveguide cross section (see, D. Dai, Y. Tang, and J. E. Bowers, "Mode conversion in tapered submicron silicon ridge optical waveguides," *Opt. Express* 20(12), 13425-13439 (2012)). Thus, there is a possibility that TE1 of the channel waveguide 110 is mode-converted to another mode such as TM0 in the rib waveguide 130 and thereby optical power is changed, and accordingly optical communication quality is reduced.

FIG. 13 is a plane schematic diagram illustrating an example of the waveguide conversion structure 100. The waveguide conversion structure 100 illustrated in FIG. 13 includes a channel waveguide 110, a rib waveguide 130, and a conversion unit 120 that connects between the channel waveguide 110 and the rib waveguide 130. The conversion unit 120 includes: a first connection 120A connected to the channel waveguide 110; a second connection 120B connected to the rib waveguide 130; and a channel core 120C that connects between the first connection 120A and the second connection 120B. The conversion unit 120 further includes a reverse-tapered slab 120D that gradually widens from the first connection 120A to the second connection 120B on both sides of the core 120C. The conversion unit 120 is a slab generation unit that includes the first connection 120A, the second connection 120B, the core 120C, and the reverse-tapered slab 120D. The conversion unit 120 has a continuous structure from the channel waveguide 110 to the rib waveguide 130 along the direction of light travel, which allows very low-loss waveguide conversion.

FIG. 14 is a cross-sectional schematic diagram illustrating an example of a cross section, taken along a line A-A in FIG. 13. The cross section illustrated in FIG. 14 is that of the channel waveguide 110. The channel waveguide 110 includes: a lower cladding 140A stacked on a not-illustrated substrate; a core 110A formed on the lower cladding 140A; and an upper cladding 140B stacked on the lower cladding 140A and the core 110A. The core width of the core 110A of the channel waveguide 110 is 0.5 μm, and the thickness of the core 110A of the channel waveguide 110 is 0.22 μm.

FIG. 15 is a cross-sectional schematic diagram illustrating an example of a cross section, taken along a line B-B in FIG. 13. The cross section illustrated in FIG. 15 is that of the rib waveguide 130. The rib waveguide 130 includes: a lower cladding 140A stacked on a not-illustrated substrate; a core 130A and a slab 130B both formed on the lower cladding 140A; and an upper cladding 140B stacked on the lower cladding 140A and the core 130A. The core width of the core 130A of the rib waveguide 130 is 0.8 μm, the slab width thereof is 3 μm, and the thickness of the core 130A is 0.22 μm.

The length of the conversion unit (the slab generation unit) 120 is 30 μm and the thickness of the conversion unit 120 is 0.22 μm. The wavelength of the light guided in the waveguide conversion structure 100 is 1.55 μm.

The related technologies are described, for example, in: Japanese Laid-open Patent Publication No. 2014-041253; Japanese National Publication of International Patent Application No. 2006-517673; International Publication Pamphlet No. WO 2014/196103; U.S. Patent Application Publication No. 2016/0246005; Japanese Laid-open Patent Publication No. 2016-188956; and D. Dai, Y. Tang, and J. E. Bowers, "Mode conversion in tapered submicron silicon ridge optical waveguides," Opt. Express 20(12), 13425-13439 (2012).

In the waveguide conversion structure 100 illustrated in FIG. 13, the calculated effective refractive indexes Neff of waveguide modes, namely, TE0, TE1, and TM0, in the cross section of the rib waveguide 130 after conversion are 2.586, 2.191, and 2.1 or less, respectively. In contrast, when results at a core width w=500 nm illustrated in FIG. 12 are referred to, the effective refractive index of TM0 is larger than the effective refractive index of TE in the channel waveguide 110. In other words, in the rib waveguide 130 after the conversion, the effective refractive index of TE1 is larger than the effective refractive index of TM0.

When the refractive index distribution of a cross section of the channel waveguide 110 in the waveguide conversion structure 100 is vertically symmetric, TE1 is outputted as TE1 and TM0 is outputted as TM0. In contrast, when the refractive index distribution of a cross section of the rib waveguide 130 of the waveguide conversion structure 100 is vertically asymmetric, the waveguide is continuously mode-converted along the direction of light travel to cause TE1 and TM0 to interact with each other, and, for example, TE1 is converted to TM0 and TM0 is converted to TE1.

In the waveguide conversion structure 100, the transmittance of TE1 inputted on the channel waveguide 110 side was calculated using a finite difference time domain (FDTD) method. Note that the transmittance can represent a ratio of the light intensity of TE1 outputted to the rib waveguide 130 to the light intensity of TE1 inputted to the channel waveguide 110. As a result of the calculation, the transmittance of TE1 is −10.07 dB when the wavelength of light guided is 1.55 μm. Energy that TE1 has lost transitions to another mode, and therefore, even when a structure intended to remove TE1 is provided in the rib waveguide 130, the transmittance of TE1 only has an effect corresponding to −10.07 dB.

The energy having transitioned from TE1 to another mode reversely acts when returning from the rib waveguide 130 to the channel waveguide 110, and thereby the energy passes through the rib waveguide 130 at a maximum transmission of −10.07 dB, whereby the removal effect is limited. Therefore, from the viewpoint of removing TE1, it is not preferable that TE1 is converted to another mode in the waveguide conversion structure 100 for the channel waveguide 110 and the rib waveguide 130. In other words, there is a need for a waveguide conversion structure that realizes a waveguide conversion to substantially prevent a transition to an unnecessary mode between the channel waveguide and the rib waveguide.

SUMMARY

According to an aspect of an embodiment, an optical device includes a lower cladding formed on a substrate, a core formed on the lower cladding, and an upper cladding covering the core. The optical device includes a first channel waveguide, a second channel waveguide connected to the first channel waveguide, a slab generator connected to the second channel waveguide, and a rib waveguide connected to the slab generator. The second channel waveguide includes a first connection connected to the first channel waveguide and a second connection connected to the slab generator. The second channel waveguide is wider at the second connection than at the first connection. A slab region of the slab generator includes a third connection connected to the rib waveguide, and the slab region widens from the second connection of the second channel waveguide toward the third connection. Effective refractive indexes of waveguide modes at the first connection are larger in an order of Transverse Electric (TE) 0, Transverse Magnetic (TM) 0, and TE1. Effective refractive indexes of the waveguide modes at the second connection are larger in an order of TE0, TE1, and TM0. Effective refractive indexes of the waveguide modes at the third connection are larger in an order of TE0, TE1, and TM0.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the disclosed technology is not limited by the embodiments. The embodiments described below may be suitably used in combination consistently.

(a) First Embodiment

Figure 1:
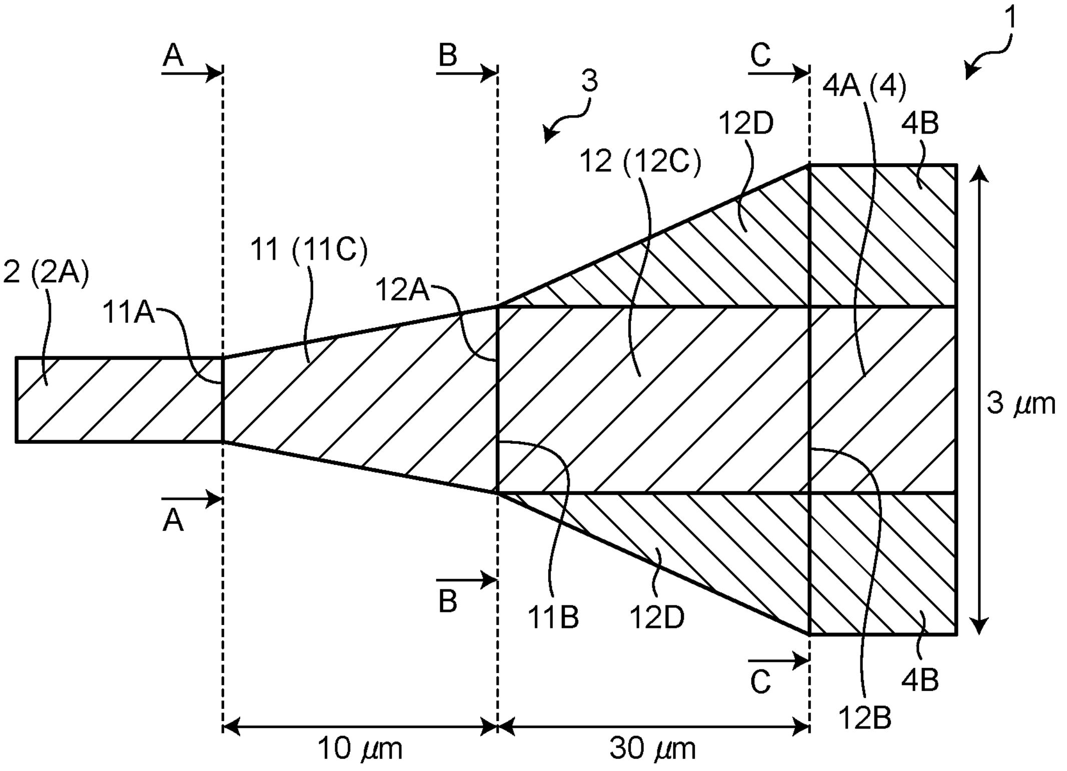
FIG. 1 is a plane schematic diagram illustrating an example of an optical device according to a first embodiment.

FIG. 1 is a plane schematic diagram illustrating an example of an optical device 1 according to a first embodiment. The optical device 1 illustrated in FIG. 1 has a connection conversion structure that connects between a first channel waveguide 2 and a rib waveguide 4. The optical device 1 includes the first channel waveguide 2, the rib waveguide 4, and a conversion unit 3 that connects between the first channel waveguide 2 and the rib waveguide 4. The conversion unit 3 includes: a second channel waveguide 11 connected to the first channel waveguide 2; and a slab generation unit 12 connected to the second channel waveguide 11 and connected to the rib waveguide 4.

The second channel waveguide 11 includes: a first connection 11A connected to the first channel waveguide 2; and a second connection 11B connected to the slab generation unit 12. The second channel waveguide 11 includes a channel core 11C disposed between the first connection 11A and the second connection 11B and gradually widening from the first connection 11A to the second connection 11B. The slab generation unit 12 includes: a third connection 12A connected to the second channel waveguide 11; and a fourth connection 12B connected to the rib waveguide 4. The slab generation unit 12 includes: the channel core 12C that connects between the third connection 12A and the fourth connection 12B; and a reverse-tapered slab 12D that gradually widens from the second channel waveguide 11 to the rib waveguide 4 on both sides of the core 12C.

Figure 2:
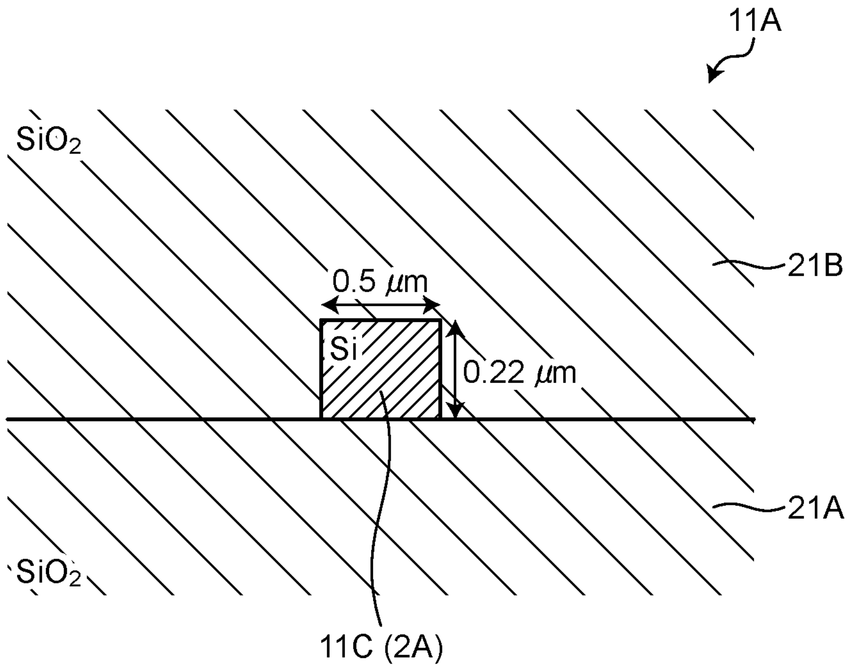
FIG. 2 is a cross-sectional schematic diagram illustrating an example of a cross section, taken along a line A-A in FIG. 1.

FIG. 2 is a cross-sectional schematic diagram illustrating an example of a cross section, taken along a line A-A in FIG. 1. The cross section illustrated in FIG. 2 is a cross section of the first connection 11A. The first connection 11A includes: a not-illustrated substrate; a $SiO_2$ lower cladding 21A stacked on the substrate; a channel-shaped core 11C formed on the lower cladding 21A; and a $SiO_2$ upper cladding 21B covering the lower cladding 21A and the core 11C. The core 11C illustrated in FIG. 2 connects to a core 2A of the first channel waveguide 2. The core width of the core 11C is identical to the core width of the core 2A. The core width of the core 11C is, for example, 0.5 μm. For the convenience of explanation, cross sections of the core 2A and the core 11C, the cross sections being perpendicular to the direction of light travel, has a vertically symmetric rectangular shape, for example.

Figure 3:
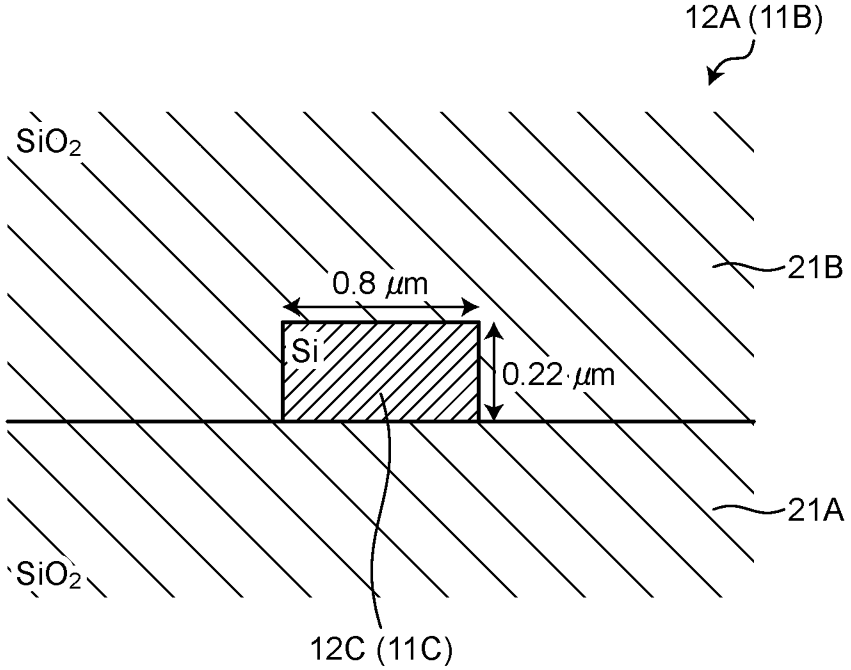
FIG. 3 is a cross-sectional schematic diagram illustrating an example of a cross section, taken along a line B-B in FIG. 1.

FIG. 3 is a cross-sectional schematic diagram illustrating an example of a cross section, taken along a line B-B in FIG. 1. The cross section illustrated in FIG. 3 is a cross section of the second connection 11B and a cross section of the third connection 12A. The second connection 11B illustrated in FIG. 3 includes: the not-illustrated substrate; the lower cladding 21A stacked on the substrate; the channel core 11C formed on the lower cladding 21A; and the upper cladding 21B stacked on the lower cladding 21A and the core 11C. The core 11C illustrated in FIG. 3 connects to the core 12C of the slab generation unit 12. The core width of the core 11C is identical to the core width of the core 12C. The core width of the core 11C is, for example, 0.8 μm.

Figure 4:
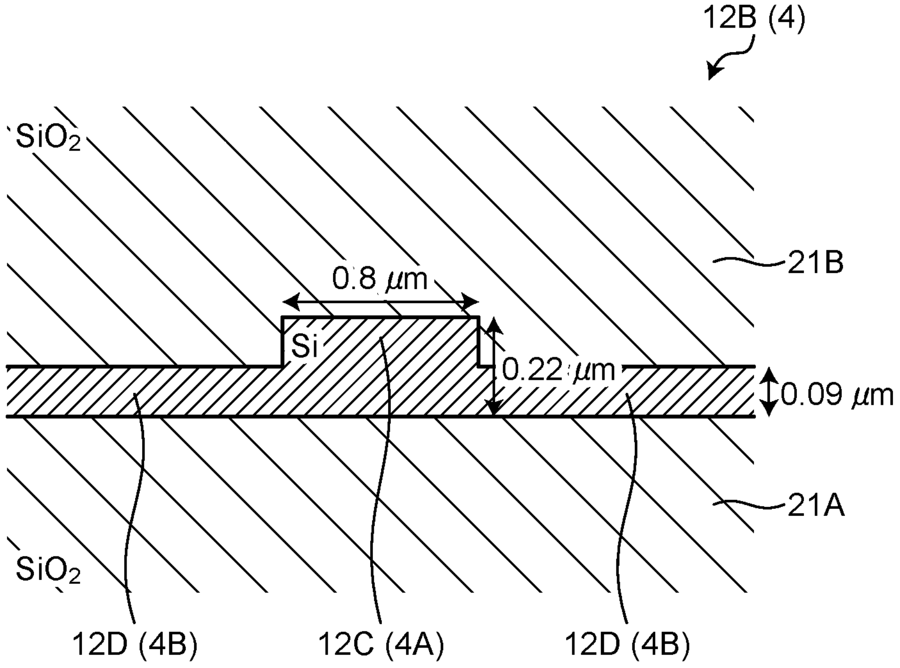
FIG. 4 is a cross-sectional schematic diagram illustrating an example of a cross section, taken along a line C-C in FIG. 1.

FIG. 4 is a cross-sectional schematic diagram illustrating an example of a cross section, taken along a line C-C in FIG. 1. The cross section illustrated in FIG. 4 is a cross section of a fourth connection 12B. The fourth connection 12B illustrated in FIG. 4 includes: the not-illustrated substrate; the lower cladding 21A stacked on the substrate; the core 12C formed on the lower cladding 21A; the slab 12D disposed on both sides of the core 12C; and the upper cladding 21B stacked on the core 12C and the slab 12D. The core 12C illustrated in FIG. 4 connects to a core 4A of the rib waveguide 4. The core width of the core 12C is identical to the core width of the core 4A. The core width of the core 11C is, for example, 0.8 μm.

Figure 5:
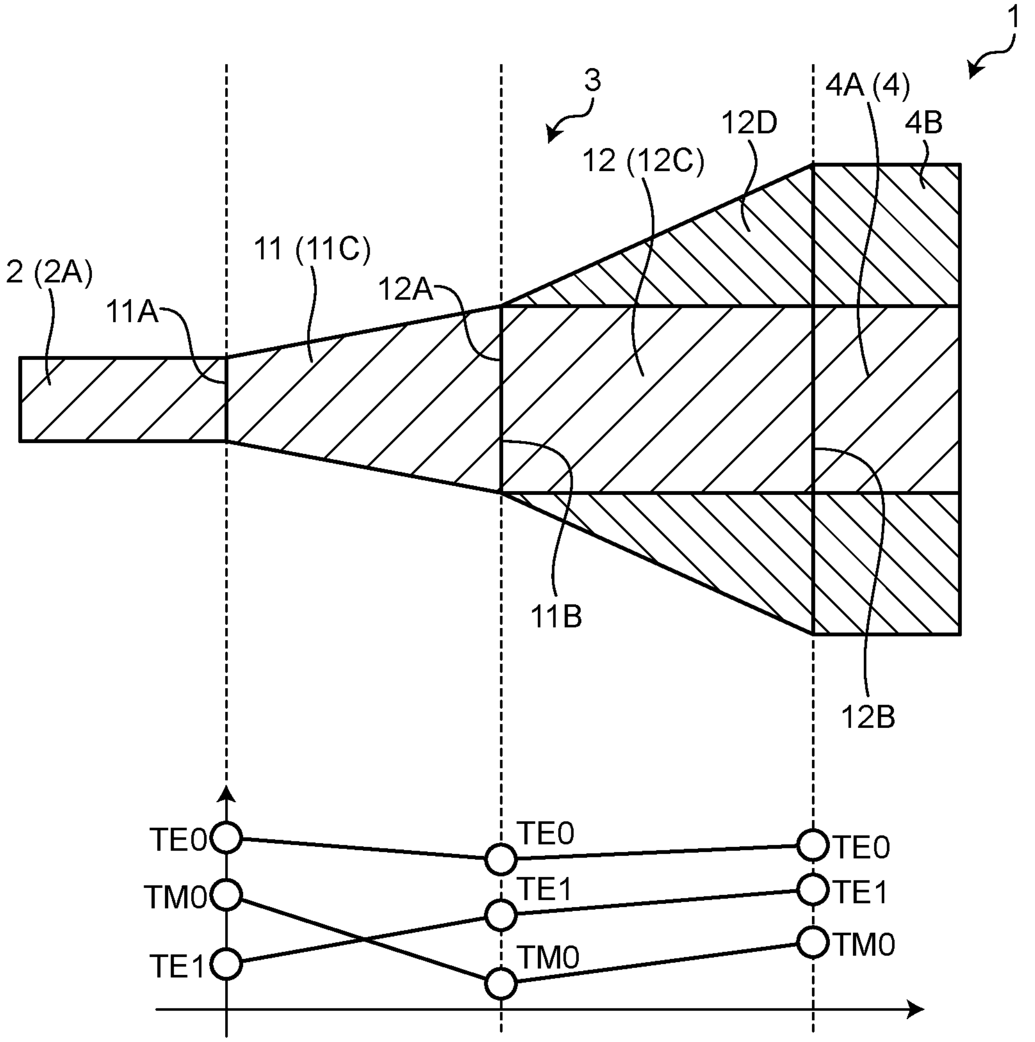
FIG. 5 is a diagram illustrating an example of transitions of waveguide modes at portions in the optical device.

FIG. 5 is a diagram illustrating an example of transitions of waveguide modes at portions in the optical device 1. The length of the second channel waveguide 11, that is, the length between the first connection 11A and the second connection 11B is 10 μm, for example. The length of the slab generation unit 12, that is, the length between the third connection 12A and the fourth connection 12B is, for example, 30 μm. The waveguide width (the core width+the slab width) of the rib waveguide 4 is, for example, 3 μm. The thickness of the core of each of the first channel waveguide 2, the second channel waveguide 11, the slab generation unit 12, and the rib waveguide 4 is, for example, 0.22 μm. That is, the first channel waveguide 2, the second channel waveguide 11, the slab generation unit 12, and the rib waveguide 4 are identical in core thickness. The thickness of each of the reverse-tapered slab 12D of the slab generation unit 12 and a slab 4B of the rib waveguide 4 is, for example, 0.09 μm.

A material refractive index N1 of the upper cladding 21B is within a range of $N2\times0.95<N1<N2\times1.05$, with respect to a material refractive index N2 of the lower cladding 21A. Here, the difference between the material refractive index of the upper cladding 21B and the material refractive index of the lower cladding 21A is within a range of ±5%. In particular, the material refractive index N1 of the upper cladding 21B is preferably within a range of $N2\times0.97<N1<N2\times1.03$. Here, the difference between the material refractive index of the upper cladding 21B and the material refractive index of the lower cladding 21A is within a range of ±3%.

The effective refractive index at a cut portion of the first connection 11A is larger in the order of TE0, TM0, and TE1. The effective refractive index at a cut portion of the second connection 11B is larger in the order of TE0, TE1, and TM0. The effective refractive index at a cut portion of the fourth connection 12B is larger in the order of TE0, TE1, and TM0.

The second channel waveguide 11 is configured to be an almost vertically symmetric channel waveguide and therefore the amount of mode conversion is almost negligible, so that TE0 is outputted as TE0, TM0 is outputted as TM0, and TE1 is outputted as TE1, and the effective refractive index of the output satisfies TE0>TE1>TM0. On the other hand, the effective refractive index of the output of the slab generation unit 12 also satisfies TE0>TE1>TM0. In other words, the effective refractive index of the output of the second channel waveguide 11 and the effective refractive index of the output of the slab generation unit 12 satisfy a relationship TE0>TE1>TM0. For the convenience of explanation, the dimensional parameters are just examples for satisfying the above-described conditions, and can be suitably changed.

In the second channel waveguide 11, the difference between the effective refractive index of the upper cladding 21B and the effective refractive index of the lower cladding 21A is within a specified tolerance, and accordingly any refractive index cross section is vertically symmetric. On the other hand, although the magnitude relationship between the effective refractive index of TE1 and the effective refractive index TM0 is reversed, a condition that the refractive index cross section is vertically symmetric is satisfied, so that, even when the magnitude relationship between the effective refractive index of TE1 and the effective refractive index of TM0 is reversed at some midpoint in a reverse-tapered portion, interaction can be weakened. As a result, the magnitude relationship between the effective refractive index of TE1 and the effective refractive index of TM0 can be reversed almost without a transition of TE1 to another mode.

When the wavelength of light guided through the first connection 11A is 1.55 μm, the effective refractive indexes of a cross section of the first connection 11A are 2.446 for TE0, 1.771 for TM0, and 1.493 for TE1. When the wavelength of light guided through the second connection 11B is 1.55 μm, the effective refractive indexes of a cross section of the second connection 11B are 2.689 for TE0, 1.907 for TM0, and 2.169 for TE1.

In the slab generation unit 12, the magnitude relationship between TE1 and TM0 at cross sections of the third connection 12A and the fourth connection 12B does not change, and accordingly mode conversion between TE1 and TM0 does not occur. When the wavelength of light guided is 1.55 μm, the effective refractive indexes of a cross section of the fourth connection 12B are 2.719 for TE0, 2.1 for TM0, and 2.356 for TE1. Thus, the difference between the effective refractive index of the upper cladding 21B and the effective refractive index of the lower cladding 21A is within a predetermined tolerance, and therefore there is taken advantage of the fact that the refractive index cross section of the channel waveguide is vertically symmetric. Then, mode conversion of the magnitude relationship between the effective refractive index of TE1 and the effective refractive index of TM0 is performed in the channel waveguide instead of the rib waveguide, unlike the conventional technology. As a result, in the second channel waveguide 11, mode conversion of TE1 to another mode can be substantially prevented.

Figure 6:
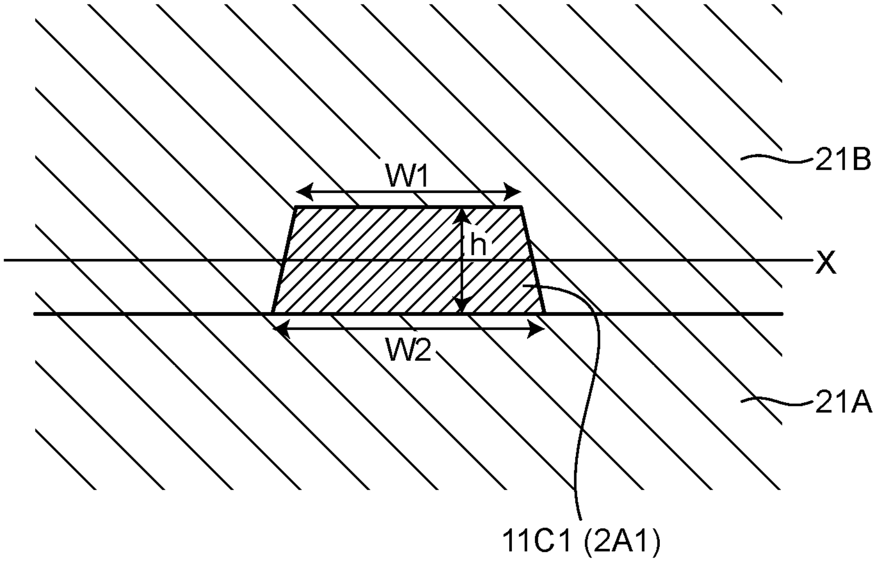
FIG. 6 is a cross-sectional schematic diagram illustrating an example of a first channel waveguide (a second channel waveguide) having a trapezoidal cross section.

The cross section of the first channel waveguide 2 is illustrated to have a rectangular shape, but may have a trapezoidal shape that approximates to the rectangular shape. Similarly, the cross section of the second channel waveguide 11 configured to be a channel waveguide is illustrated to have a rectangular shape, but may have a trapezoidal shape that approximates to the rectangular shape and the shape of the cross section can be suitably changed. In actual manufacturing, the shape of the cross sections of the first channel waveguide 2 and the second channel waveguide 11 are sometimes trapezoidal, but are more greatly vertically symmetric than that of the rib waveguide 4, which is greatly vertically asymmetric. This can substantially prevent mode conversion of TE1 to another mode. FIG. 6 is a cross-sectional schematic diagram illustrating an example of the first channel waveguide 2 (the second channel waveguide 11) having a trapezoidal cross section. The cross section of a core 11C1 of the second channel waveguide 11 illustrated in FIG. 6 has a trapezoidal shape. The cross section of a core 2A1 of the first channel waveguide 2 has a trapezoidal shape. The core width of the core 11C1 (2A1) is the average of the widths of the upper bottom and the lower bottom. For the second channel waveguide 11 (the first channel waveguide 2) is such that the upper side W1 and the lower side W2 of the core 11C1 (2A1) are different from each other, and a sidewall angle θ can be defined as tan θ=2 h/|W2−W1|, where h is the thickness of the core 11C1 (2A1).

In this case, the sidewall angle θ is, for example, preferably within a range of 70° to 90°, and particularly preferably within a range of 75° to 85°. When the sidewall angle θ is such that 70°≤θ≤90°, although the refractive index distribution of the cross section of the second channel waveguide 11 is vertically asymmetric, TE1 can be outputted as TE1 and TM0 can be outputted as TM0, as in the case of the second channel waveguide 11 having a rectangular-shaped refractive index distribution being vertically symmetric.

Figure 7:
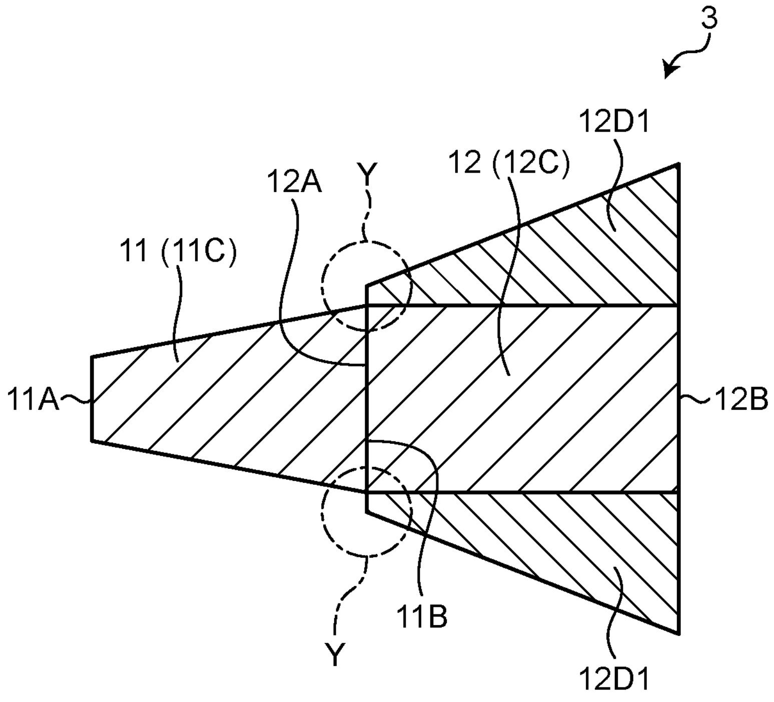
FIG. 7 is a plane schematic diagram illustrating an example of a conversion unit.

The reverse-tapered slab 12D of the slab generation unit 12 has a structure in which the slab width of the third connection 12A is 0 μm, and the slab 12D continuously and gradually widens from the third connection 12A toward the fourth connection 12B, but the slab 12D is not limited to this structure. FIG. 7 is a plane schematic diagram illustrating the conversion unit 3. The cross section of the third connection 12A from which a reverse-tapered slab 12D1 of the third connection 12A starts has not a continuous structure starting with a slab width of 0 μm, but a slightly discontinuous structure, as illustrated by a dot-and-dash line Y in FIG. 7. However, when this discontinuity can be considered sufficiently small with respect to the scale of a wavelength, the cross section can also be considered to have a continuous structure.

The transmittance of TE1 passing through the rib waveguide 4 when TE1 was inputted to the first channel waveguide 2 was calculated using FDTD. When the wavelength of the light guided through the first channel waveguide 2 was 1.55 μm, the transmittance of TE1 was −0.13 dB (97.1%). As a result, it can be understood that TE1 guided through the first channel waveguide 2 is outputted to the rib waveguide 4 almost without a transition to another mode.

The optical device 1 in the first embodiment includes the first channel waveguide 2, the second channel waveguide 11, the slab generation unit 12, and the rib waveguide 4. The second channel waveguide 11 includes the first connection 11A connected to the first channel waveguide 2 and the second connection 11B connected to the slab generation unit 12. The second channel waveguide 11 is wider at the second connection 11B than at the first connection 11A. The slab 12D of the slab generation unit 12 includes the fourth connection 12B connected to the rib waveguide 4, and widens from the second connection 11B of the second channel waveguide 11 toward the fourth connection 12B. The effective refractive indexes of the waveguide modes at the first connection 11A are larger in the order of TE0, TM0, and TE1, meanwhile the effective refractive indexes of the waveguide modes at the second connection 11B and the fourth connection 12B are larger in the order of TE0, TE1, and TM0. Thus, mode conversion of TE1 and TM0 is substantially prevented by reversing the magnitude relationship between TM0 and TE1. Then, conversion can be performed between the rib waveguide 4 and the first channel waveguide 2 while a transition to an unnecessary mode is substantially prevented.

The optical device 1 takes advantage of the fact that the effective refractive index of the upper cladding 21B is approximately equal to the effective refractive index of the lower cladding 21A and the refractive index cross section of the second channel waveguide 11 is vertically symmetric. Then, mode conversion of the magnitude relationship between the effective refractive index of TE1 and the effective refractive index of TM0 is performed in the channel waveguide instead of the rib waveguide, unlike the conventional technology. As a result, in the second channel waveguide 11, mode conversion of TE1 to another mode can be substantially prevented.

Since the second channel waveguide 11 is a waveguide including a core having a rectangular or approximately rectangular cross section, the refractive index cross section of the second channel waveguide 11 is vertically symmetric, compared to that of the rib waveguide. Thus, mode conversion of TE1 and TM0 is substantially prevented by reversing the magnitude relationship between TM0 and TE1. Then, conversion can be performed between the rib waveguide 4 and the first channel waveguide 2 while a transition to an unnecessary mode is substantially prevented.

The second channel waveguide 11 reduces the amount of mode conversion from TE1 to TM0 and the amount of mode conversion from TM0 to TE1, among the waveguide modes to be guided. As a result, in the second channel waveguide 11, mode conversion of TE1 to another mode can be substantially prevented.

In the rib waveguide 4 of the optical device 1, removal of TE1 allows TE1 inputted to the first channel waveguide 2 to be efficiently removed. Examples of a TE1 removal structure include a directional coupler including the rib waveguide 4. Thus, unnecessary TE1 inputted to the first channel waveguide 2 can be efficiently removed.

The directional coupler serving as the TE1 removal structure includes two rib waveguides arranged in parallel in a direction perpendicular to the direction of light travel, and makes use of light leakage from the core to cause a light transition from one rib waveguide to the other rib waveguide adjacent to the one rib waveguide. Thus, unnecessary TE1 inputted to the first channel waveguide 2 can be efficiently removed.

Figure 8A:
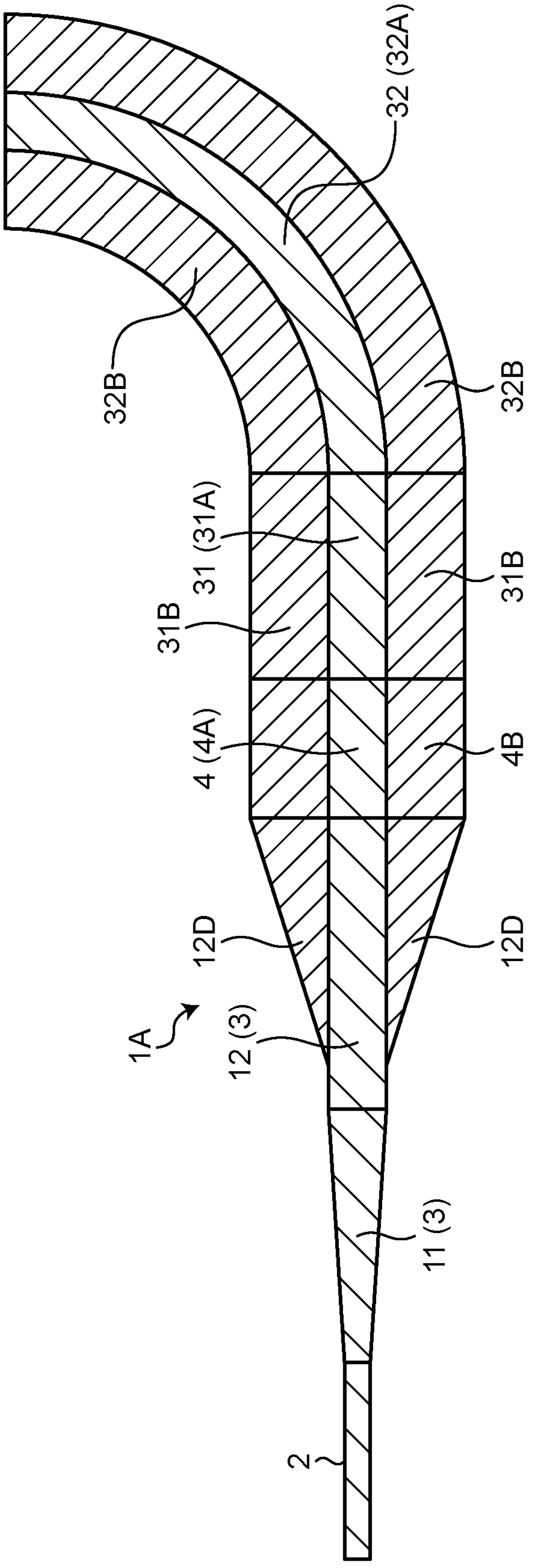
FIG. 8A is a plane schematic diagram illustrating an example of an optical device according to a second embodiment.

In the optical device 1, the linear rib waveguide 4 is illustrated as an example as the structure for removing TE1, but the rib waveguide 4 may be a curved rib waveguide. An embodiment including the curved rib waveguide will be described below as a second embodiment. FIG. 8A is a plane schematic diagram illustrating an example of an optical device 1A according to the second embodiment.

(b) Second Embodiment

The optical device 1A illustrated in FIG. 8A includes a first channel waveguide 2, a conversion unit 3, a rib waveguide 4, a first rib waveguide 31, and a second rib waveguide 32. The first rib waveguide 31 is a linear rib waveguide connected to the rib waveguide 4. The first rib waveguide 31 includes a core 31A and a slab region 31B extending from both sides of the core 31A. The second rib waveguide 32 is a curved rib waveguide connected to the first rib waveguide 31. The second rib waveguide 32 includes a core 32A and a slab region 32B extending from both sides of the core 32A. In general, weaker confinement to the core causes a greater loss caused by light leaking to the outside when light passes through a curved waveguide of the same radius. When TE0 is used as signal light, the effective refractive index of TE0 is larger than the effective refractive index of TE1, which results in greater confinement of light to the core. Therefore, TE1 can be selectively removed by the curved waveguide.

In particular, the linear rib waveguide has weaker light-confinement in the width direction than the channel waveguide and therefore has a greater removal effect of removing TE1 while increasing a loss of TE1. The curved rib waveguide may be in a circular arc shape or may be in the shape of a transition curve such as a clothoid curve, for example, a curve whose curvature is continuous along the direction of light travel, and can be suitably changed. The transition curve leads to a smaller loss caused by mode mismatching than a circular arc, and thus can reduce a loss of TE0. For the convenience of explanation, the shape of the first rib waveguide 31 and the shape of the second rib waveguide 32 are not limited to the above-mentioned shape, and can be suitably changed. In other words, TE1 can be selectively removed using the linear first rib waveguide 31 and the curved second rib waveguide 32.

By using the second channel waveguide 11 and the slab generation unit 12, the optical device 1A according to the second embodiment substantially prevents mode conversion of TE1 and TM0 while reversing the magnitude relationship between TM0 and TE1. Then, conversion can be performed between the rib waveguide 4 and the first channel waveguide 2 while a transition to an unnecessary mode is substantially prevented. Furthermore, by using the linear first rib waveguide 31 and the curved second rib waveguide 32, the optical device 1A can selectively remove TE1 while reducing a loss of TE0.

Figure 8B:
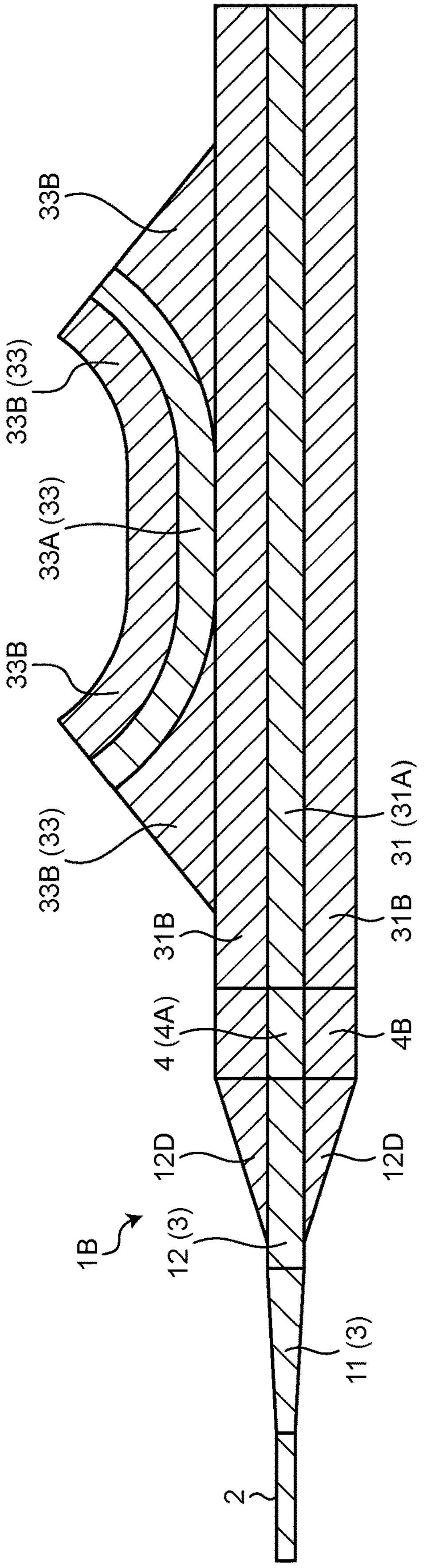
FIG. 8B is a plane schematic diagram illustrating an example of the optical device according to the second embodiment.

The directional coupler serving as the TE1 removal structure includes two rib waveguides arranged in parallel in a direction perpendicular to the direction of light travel, and makes use of light leakage from the core to cause a light transition from one rib waveguide to the other rib waveguide adjacent to the one rib waveguide. FIG. 8B is a plane schematic diagram illustrating an example of an optical device 1B according to the second embodiment.

The optical device 1B illustrated in FIG. 8B includes the first channel waveguide 2, the conversion unit 3, the rib waveguide 4, the first rib waveguide 31, and a third rib waveguide 33. The first rib waveguide 31 is a linear rib waveguide connected to the rib waveguide 4. The first rib waveguide 31 includes the core 31A and the slab region 31B extending from both sides of the core 31A. The third rib waveguide 33 is a curved rib waveguide adjacent to the first rib waveguide 31. The third rib waveguide 33 includes a core 33A and a slab region 33B extending from both sides of the core 33A. The slab region 33B extends toward the slab region 31B of the first rib waveguide 31. In general, weaker confinement to the core makes easier a light transition between the first rib waveguide 31 and the third rib waveguides 33. When TE0 is used as signal light, the effective refractive index of TE0 is larger than the effective refractive index of TE1, which results in stronger confinement of the signal light to the core. Therefore, the directional coupler including the first rib waveguide 31 and the third rib waveguide 33 causes a selective transition of TE1 from the first rib waveguide 31 to the third rib waveguide 33, whereby TE1 can be selectively removed.

In particular, the rib waveguide has weaker confinement in the width direction than the channel waveguide and causes a selective transition of TE1 from the first rib waveguide 31 to the third rib waveguide 33, and has therefore a greater removal effect of removing TE1. For the convenience of explanation, the shape of the first rib waveguide 31 and the shape of the third rib waveguide 33 is not limited to the above-mentioned shape and can be suitably changed. In other words, TE1 can be selectively removed by using the linear first rib waveguide 31 and the curved third rib waveguide 33. Thus, unnecessary TE1 inputted to the first channel waveguide 2 can be efficiently removed.

For the convenience of explanation, the case in which the core is made of Si and the lower cladding 21A and the upper cladding 21B are made of SiO2 is illustrated, but the embodiment is not limited to this.

The conversion unit 3 according to the present embodiment may be a PLC in which the cores 11C, 12C, the lower cladding 21A, and the upper cladding 21B are all made of $SiO_2$, or may be an InP waveguide or a GaAs waveguide. The conversion unit 3 may be a Si waveguide in which the cores 11C, 12C are made of Si, the lower cladding 21A is made of $SiO_2$, and the upper cladding 21B is made of $SiO_2$, air, or SiN, for example. A Si waveguide is preferably used because the Si waveguide leads to a large specific refractive index difference and thereby leads to stronger light-confinement, and thus a low-loss curved waveguide with a small R can be realized, that is, a smaller-sized optical device can be achieved.

Figure 9:
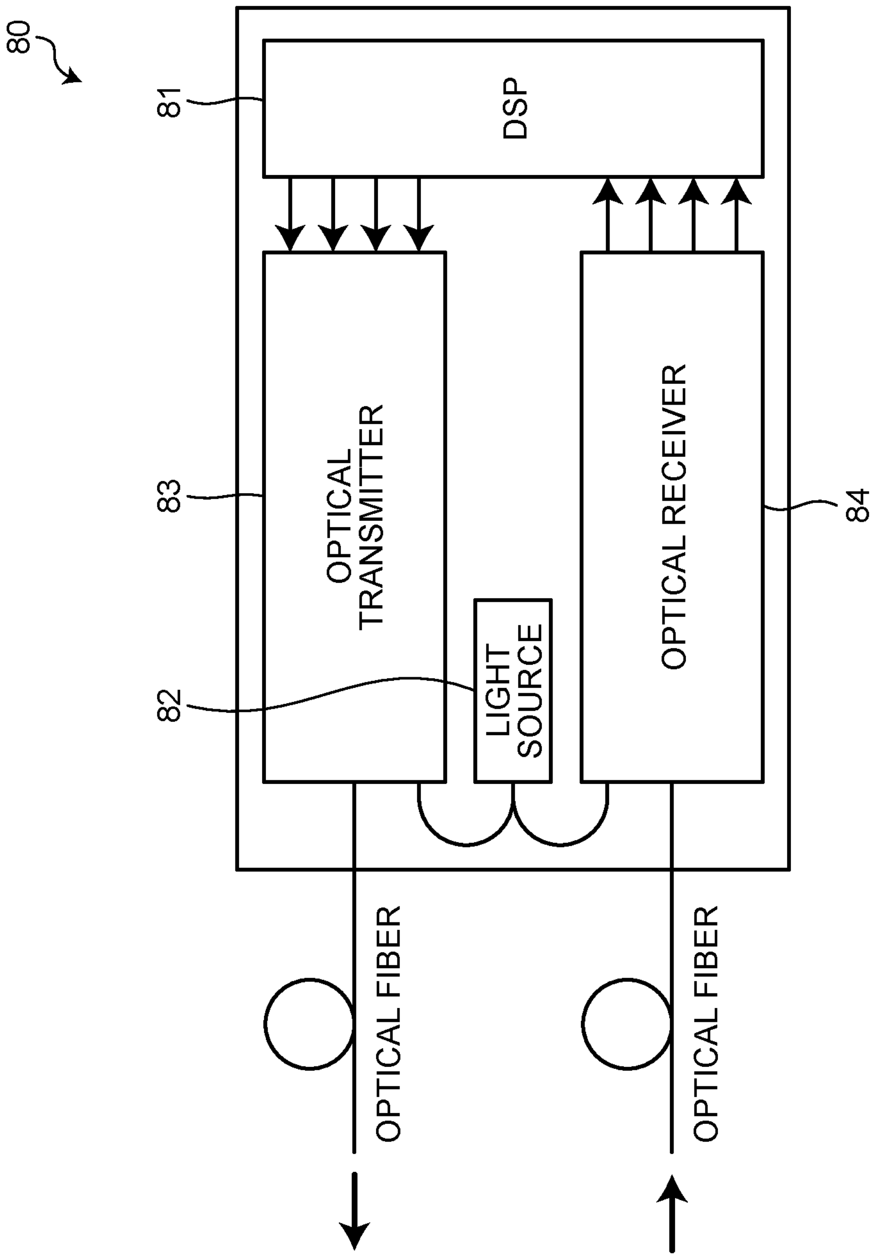
FIG. 9 is a diagram illustrating an example of an optical transceiver employing the optical device.
Figure 10:
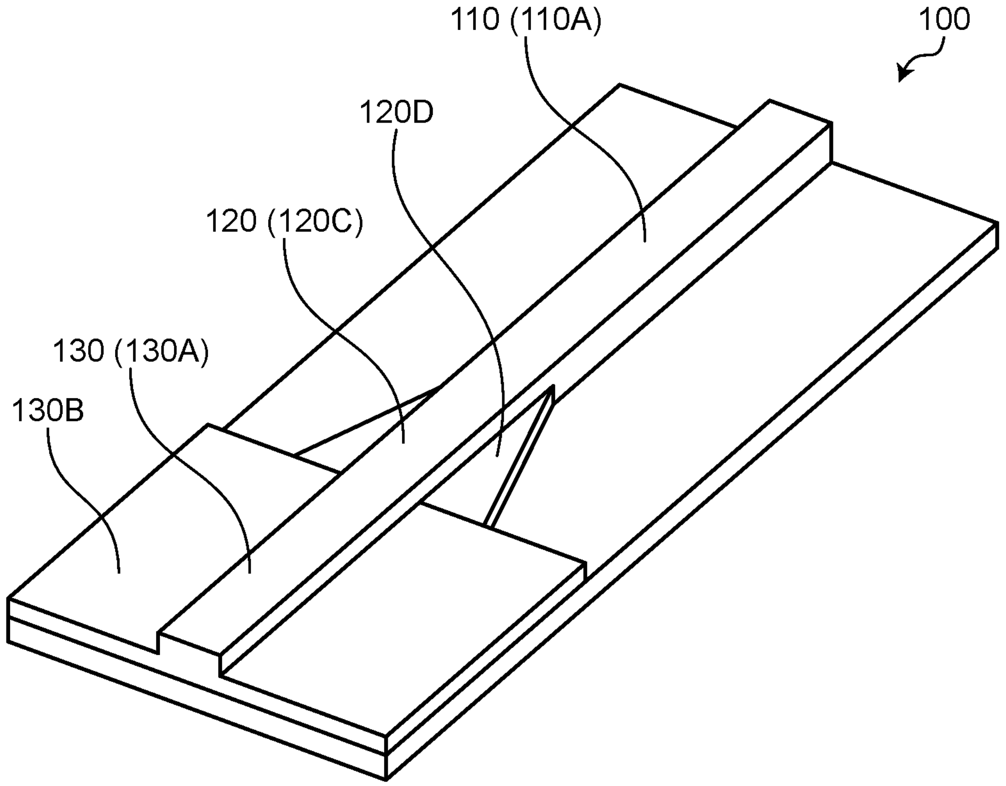
RELATED ART FIG.10
FIG. 10 is a schematic diagram illustrating an example of a conventional waveguide conversion structure.
Figure 11:
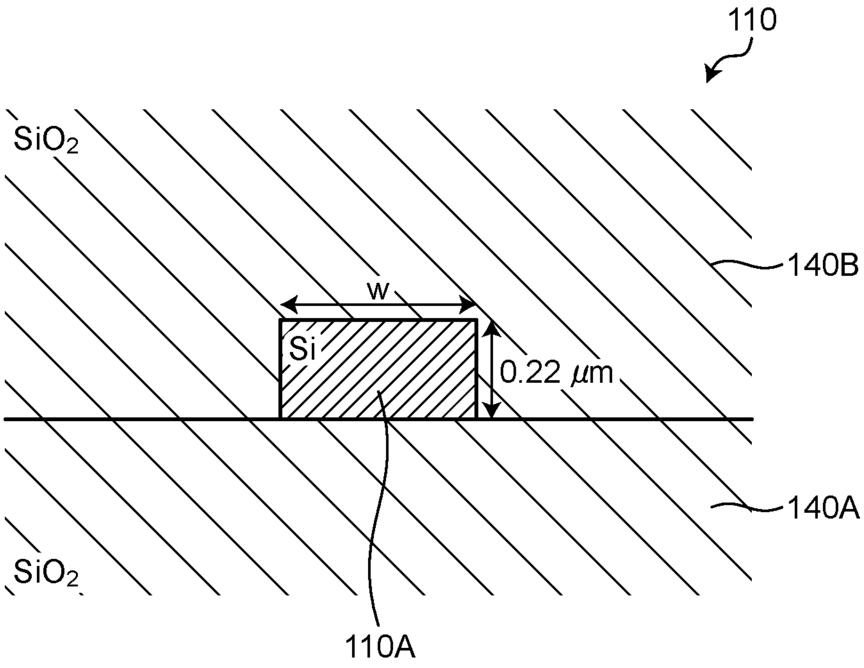
RELATED ART FIG.11
FIG. 11 is a cross-sectional schematic diagram illustrating an example of a channel waveguide.
Figure 12:
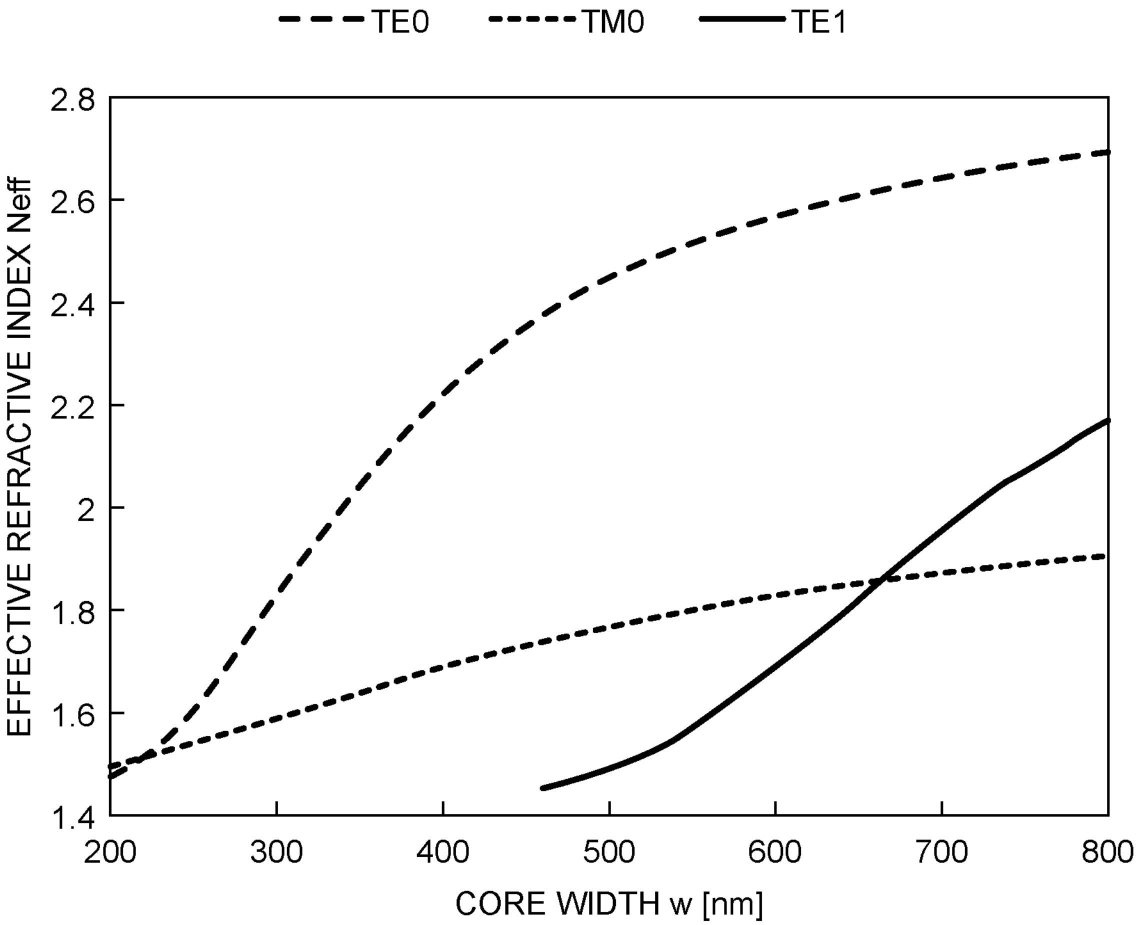
RELATED ART FIG.12
FIG. 12 is a diagram illustrating an example of a correspondence relationship between core widths and effective refractive indexes.
Figure 13:
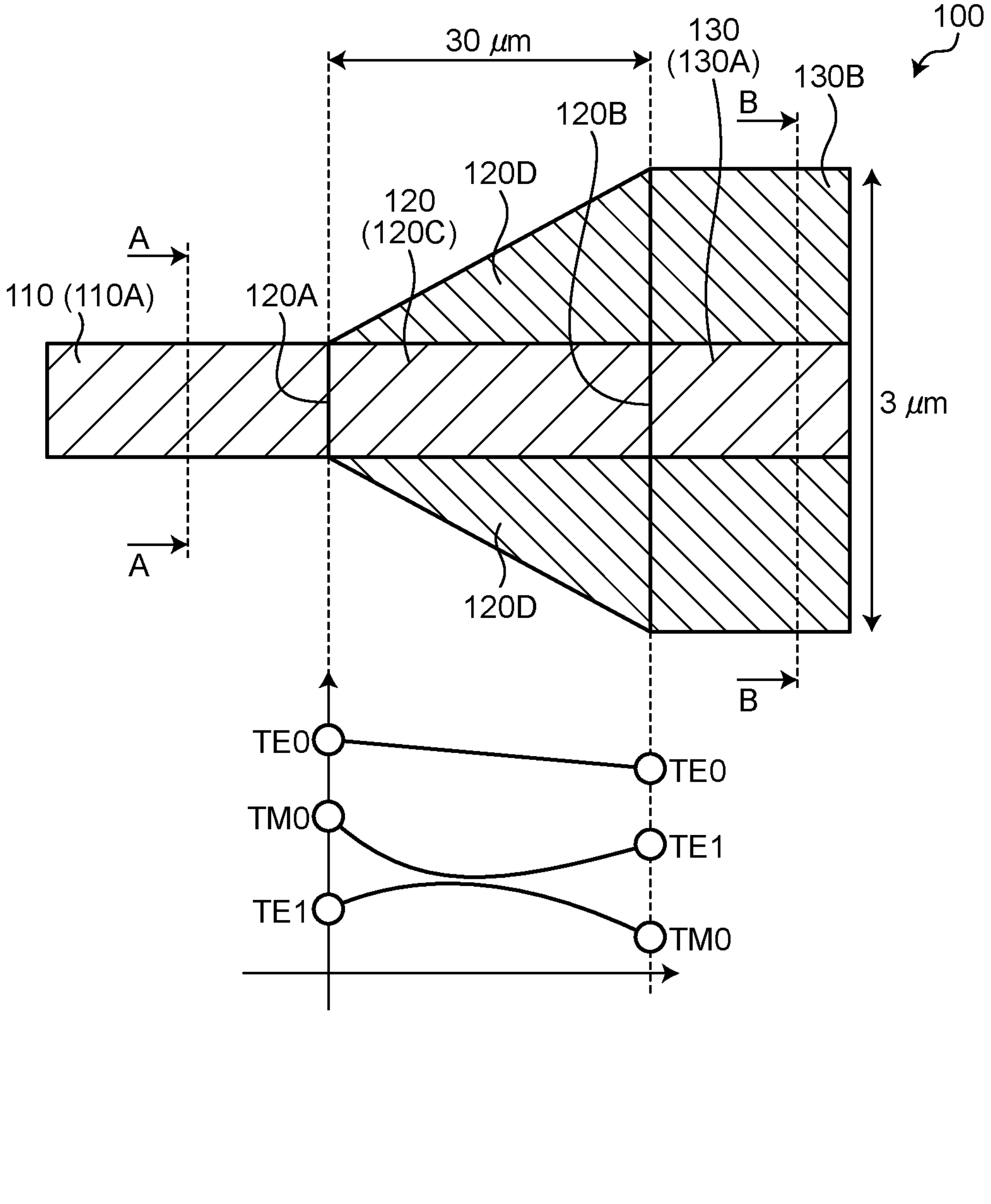
RELATED ART FIG.13
FIG. 13 is a plane schematic diagram illustrating an example of a waveguide conversion structure.
Figure 14:
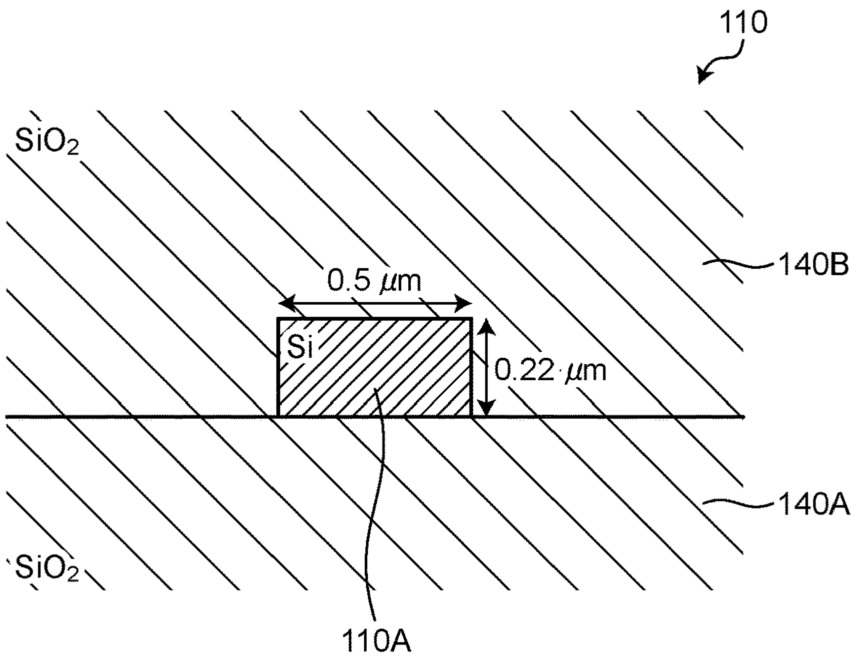
RELATED ART FIG.14
FIG. 14 is a cross-sectional schematic diagram illustrating an example of a cross section, taken along a line A-A in FIG. 13.
Figure 15:
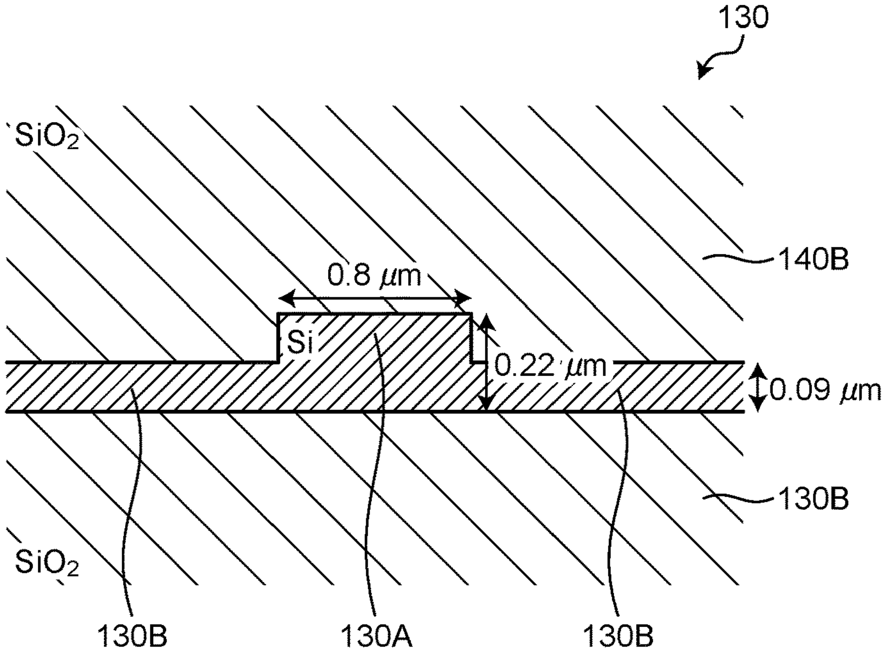
RELATED ART FIG.15
FIG. 15 is a cross-sectional schematic diagram illustrating an example of a cross section, taken along a line B-B in FIG. 13.

An optical transceiver 80 employing the optical device 1 (1A) according the first and second embodiments will be described. FIG. 9 is a diagram illustrating an example of the optical transceiver 80 employing the optical device 1 (1A). The optical transceiver 80 illustrated in FIG. 9 connects to an output optical fiber and an input optical fiber. The optical transceiver 80 includes a digital signal processor (DSP) 81, a light source 82, an optical transmitter 83, and an optical receiver 84. The DSP 81 is an electrical component that performs digital signal processing. The DSP 81, for example, performs processing such as encoding of transmission data, generates an electrical signal containing the transmission data, and outputs the generated electrical signal to the optical transmitter 83. Furthermore, the DSP 81 acquires an electrical signal containing received data from the optical receiver 84 and performs processing such as decoding of the acquired electrical signal to obtain the received data.

The light source 82, for example, includes a laser diode and generates light having a predetermined wavelength and supplies the light to the optical transmitter 83 and the optical receiver 84, and is an integrated tunable laser assembly (ITLA), for example. The optical transmitter 83 is an optical modulator that modulates light supplied from the light source 82 by an electrical signal outputted from the DSP 81 and outputs the obtained transmission light to an optical fiber. When light supplied from the light source 82 propagates through a waveguide, the optical transmitter 83 modulates the light by using an electrical signal to be inputted to the optical modulator, and thereby generates transmission light. The optical transmitter 83 includes the optical device 1 (1A) of the present embodiment that guides light.

The optical receiver 84 receives an optical signal from the optical fiber and demodulates the received light by using light supplied from the light source 82. Then, the optical receiver 84 converts the demodulated received light into an electrical signal and outputs the converted electrical signal to the DSP 81. The optical receiver 84 includes the optical device 1 (1A) of the present embodiment that guides light.

In the optical transceiver 80, the optical device 1 (1A) is employed, whereby mode conversion of TE1 and TM0 is substantially prevented by reversing the magnitude relationship between TM0 and TE1. Then, conversion can be performed between the rib waveguide 4 and the first channel waveguide 2 while a transition to an unnecessary mode is substantially prevented.

For the convenience of explanation, the case in which the optical transceiver 80 includes both the optical transmitter 83 and the optical receiver 84 is illustrated, but the optical transceiver 80 may include only one of the optical transmitter 83 and the optical receiver 84. For example, when including only the optical transmitter 83, the optical transceiver 80 is an optical transmitting apparatus, meanwhile, when including only the optical receiver 84, the optical transceiver 80 is an optical receiving apparatus.

In addition, the constituents of the units illustrated in the drawings are not necessarily physically configured as illustrated in the drawings. In other words, specific forms of distribution and integration of the units are not limited to those illustrated in the drawings, and all or some of them can be configured to be functionally or physically distributed or integrated in any unit, depending on types of loads, usage, and the like.

Furthermore, all or part of a processing function performed by each device may be implemented on a microcomputer such as a central processing unit (CPU), a micro processing unit (MPU), or a micro controller unit (MCU). Alternatively, as a matter of course, all or part of each processing function may be implemented on a program that is analyzed and executed by the CPU (or a microcomputer such as the MPU or the MCU) or on hardware using wired logic.

According to one aspect, a waveguide conversion capable of substantially preventing a transition to an unnecessary mode between the channel waveguide and the rib waveguide can be achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
a lower cladding formed on a substrate;
a core formed on the lower cladding; and
an upper cladding covering the core, wherein
the optical device includes:
a first channel waveguide;
a second channel waveguide connected to the first channel waveguide;
a slab generator connected to the second channel waveguide; and
a rib waveguide connected to the slab generator, wherein
the second channel waveguide includes: a first connection connected to the first channel waveguide; and a second connection connected to the slab generator, and the second channel waveguide is wider at the second connection than at the first connection,
a slab region of the slab generator includes a third connection connected to the rib waveguide, and the slab region widens from the second connection of the second channel waveguide toward the third connection,
effective refractive indexes of waveguide modes at the first connection are larger in an order of Transverse Electric (TE) 0, Transverse Magnetic (TM) 0, and TE1,
effective refractive indexes of the waveguide modes at the second connection are larger in an order of TE0, TE1, and TM0, and
effective refractive indexes of the waveguide modes at the third connection are larger in an order of TE0, TE1, and TM0.

2. The optical device according to claim 1, wherein a material refractive index of the upper cladding is approximately equal to a material refractive index of the lower cladding.

3. The optical device according to claim 1, wherein the second channel waveguide is a waveguide including a core having a rectangular or approximately rectangular cross section.

4. The optical device according to claim 1, wherein the second channel waveguide reduces an amount of mode conversion from TE1 to TM0 and an amount of mode conversion from TM0 to TE1, among waveguide modes to be guided.

5. The optical device according to claim 1, wherein the rib waveguide is a waveguide including a removal structure that removes the TE1.

6. The optical device according to claim 5, wherein the removal structure includes two rib waveguides arranged in parallel in a direction perpendicular to a direction of light travel.

7. The optical device according to claim 5, wherein the removal structure includes a curved rib waveguide.

8. The optical device according to claim 1, wherein
the core is formed of a material containing silicon, and
the upper cladding and the lower cladding are formed of a material containing $SiO_2$.

9. The optical device according to claim 1, wherein the first channel waveguide, the second channel waveguide, the slab generator, and the rib waveguide are identical in core thickness.

10. An optical transmitting apparatus comprising:
a processor that performs signal processing for an electrical signal;
a light source that generates light; and
an optical transmitter that modulates light generated from the light source by using the electrical signal outputted from the processor, wherein
an optical device in the optical transmitter includes: a lower cladding formed on a substrate; a core formed on the lower cladding; and an upper cladding covering the core,
the optical device includes:
a first channel waveguide;
a second channel waveguide connected to the first channel waveguide;
a slab generator connected to the second channel waveguide; and
a rib waveguide connected to the slab generator, wherein
the second channel waveguide includes a first connection connected to the first channel waveguide and a second connection connected to the slab generator, and the second channel waveguide is wider at the second connection than at the first connection,
a slab region of the slab generator includes a third connection connected to the rib waveguide and widens from the second connection of the second channel waveguide toward the third connection,
effective refractive indexes of waveguide modes at the first connection are larger in an order of Transverse Electric (TE) 0, Transverse Magnetic (TM) 0, and TE1,
effective refractive indexes of the waveguide modes at the second connection are larger in an order of TE0, TE1, and TM0, and effective refractive indexes of the waveguide modes at the third connection are larger in an order of TE0, TE1, and TM0.

11. An optical receiving apparatus comprising:

a light source that generates light; and an optical receiver that demodulates received light by using the light from the light source, wherein an optical device in the optical receiver includes: a lower cladding formed on a substrate; a core formed on the lower cladding; and an upper cladding covering the core, the optical device includes:

a first channel waveguide;

a second channel waveguide connected to the first channel waveguide;

a slab generator connected to the second channel waveguide; and a rib waveguide connected to the slab generator, the second channel waveguide includes a first connection connected to the first channel waveguide and a second connection connected to the slab generator, and the second channel waveguide is wider at the second connection than at the first connection, a slab region of the slab generator includes a third connection connected to the rib waveguide and widens from the second connection of the second channel waveguide toward the third connection, effective refractive indexes of waveguide modes at the first connection are larger in an order of Transverse Electric (TE) 0, Transverse Magnetic (TM) 0, and TE1, effective refractive indexes of the waveguide modes at the second connection are larger in an order of TE0, TE1, and TM0, and effective refractive indexes of the waveguide modes at the third connection are larger in an order of TE0, TE1, and TM0.

* * * * *